Patented Feb. 26, 1946

2,395,790

UNITED STATES PATENT OFFICE 2,395,790

RECOVERY OF FATTY SUBSTANCES

Ivan A. Parfentjev, Nanuet, N. Y.

No Drawing. Application June 26, 1942,
Serial No. 448,648

6 Claims. (Cl. 195—3)

This invention relates to the separation of fish liver oil from whole fish liver.

According to the usual methods for separating liver oil from whole liver, the liver is shipped from the fisheries to the processing plants, where it is treated by involved methods requiring relatively high temperatures and the use of expensive equipment. Excessive heating destroys valuable fat soluble elements in the liver, and should be avoided if possible.

It is one of the objects of the present invention to provide a simple and inexpensive method for the separation of liver oil from fish liver.

It is a further object to provide a method for recovering fish liver oil whereby destruction of valuable fat soluble elements is avoided.

It is a still further object to provide a method for the recovery of fish liver oil such that it is sufficiently simple to permit operation at the fisheries and thereby to avoid shipment to processing plants.

These and other objects are attained by the enzymatic digestion of raw liver under acid conditions at temperatures in the vicinity of room temperatures.

The process may be illustrated more specifically by the following example.

Fresh caught liver is minced by means of a mechanical grinder. An equal volume of water is added. Sufficient hydrochloric acid is added to bring the mixture to an acidity of approximately pH 1.5. Hog pepsin or its proteolytic equivalent in fish pepsin is added in an amount of about 1 part by weight of pepsin to about 1700 parts by weight of liver. This mixture is warmed to between about 90° to 100° F. for about two to three hours and allowed to stand for about three days at 70° to 80° F. This approximates room temperatures in the tropical regions where these operations are most likely to be carried out. The temperature is then raised again to about 98° F. and after a short time, oil will be found to be separated as a surface layer. The supernatant layer of oil may be separated by decantation or other suitable method to yield a yellow oil having a high vitamin content and also containing a relatively large amount of cholesterol.

While the oil obtained as just described is generally clear, it has a tendency to become slightly cloudy, especially on cooling. When the oil is cooled to about 32° F., it solidifies as an opaque mass. However, I have found that the oil may be further purified by treating it with solid magnesium lactate in the proportion of about 1 to 10% by weight, based on the weight of the oil to be treated. More specifically, as illustrative, I may add 5% of the magnesium lactate powder to the oil after it has been separated by decantation or otherwise as described. The mixture is then agitated by shaking, stirring, or the like, for a short period of time and the magnesium lactate powder is removed from the oil by filtration. The oil is then found to be brilliantly clear, pale yellow in color and to have but slight odor. This oil remains clear on standing and, while it solidifies at low temperatures, when the temperature is raised, the solid melts to form the clear oil.

This method may also be used on liver of other types of fish than shark to obtain oils containing vitamins.

In place of hog pepsin described in the specific example, it is frequently more convenient to use the fish stomach juice available at the fisheries. Of course, equivalent amounts of the fish pepsin are used in place of the hog pepsin. The acidity of the mixture during the digestion period may vary somewhat from pH 1.5 to about pH 5.0. It is desirable that a low pH be maintained during the digestion process in order to prevent bacterial action and to prevent rancidity. A pH of 1.5 represents an optimum condition for the temperatures employed. In this connection, it should be noted that the bulk of the digestion takes place at the comparatively low temperatures of about 70°–80° F. By processing the liver or the like at such low temperatures, higher yields of vitamins are obtained since elevated temperatures tend to decompose the vitamins. The temperatures of 70°–80° are approximately equivalent to room temperatures in many of those sections where the shark fisheries are located and hence, by the present process, the major portion of the operation may be carried out at room temperatures. Naturally, this simplifies the procedure and apparatus required and is obviously highly desirable from a commercial standpoint. More specifically, there is provided a simple and inexpensive method for obtaining high-grade shark liver oil at the fisheries on a large scale, said oil being obtained in good yield and having an extremely high vitamin content.

The enzyme digestion process utilized herein appears to stabilize the oil in such a manner that the oil may be allowed to stand, even in clear glass containers, for long periods of time without developing rancidity or losing its vitamin potency. No preservatives are necessary with the oil obtained in accordance with the present invention. The liver oils of commerce, previously available, were of such composition that it was found necessary to store them in amber colored or opaque containers. Even then, such oils tended to become rancid and to lose their vitamin potency so that many substances have been suggested for use as preservatives. These precautions are not necessary with oils obtained as described herein.

Suitable other changes and variations may be made in carrying out the invention without departing from the spirit and scope thereof as defined in the appended claims.

I claim:

1. A process of recovering a high-grade shark liver oil which comprises subjecting shark liver to the action of pepsin at a pH of about 1.5 and at temperatures not exceeding 100° F. until liver oil is separated, and removing the liver oil directly from the acid digestion mixture.

2. The process which comprises preparing an aqueous suspension of comminuted fish liver, adjusting the acidity of the suspension to about pH 1.5, adding a small amount of pepsin to the acidified suspension, warming slightly for several hours to a temperature between about 90°–100° F., allowing the mixture to stand for several days at about 70°–80° F., warming to about 98° F. until the liver oil separates and floats to the surface, and removing the liver oil directly from the acid digestion mixture.

3. A process of recovering a high-grade shark liver oil which comprises subjecting shark liver to the action of pepsin at a pH of about 1.5 and at temperatures not exceeding 100° F. until liver oil is separated, removing the liver oil directly from the acid digestion mixture, adding about 1–10% of solid magnesium lactate to the oil, agitating this mixture, and removing the magnesium lactate from the oil.

4. A process of recovering a high-grade shark liver oil which comprises subjecting shark liver to the action of pepsin at a pH of about 1.5 and at temperatures not exceeding 100° F. until liver oil is separated, removing the liver oil directly from the acid digestion mixture, adding about 5% of solid magnesium lactate to the oil, agitating this mixture, and removing the magnesium lactate from the oil.

5. A process of recovering fish liver oils of high vitamin content from fish livers which comprises subjecting the liver to the action of pepsin at a pH of about 1.5, and subjecting the resulting acid digestion mixture directly to a separating treatment to separate a stable oil therefrom, the process being carried out throughout at a temperature below that of substantial decomposition of the vitamin.

6. A process of recovering fish liver oils of high vitamin content from fish livers which comprises subjecting the liver to the action of fish pepsin at a pH of about 1.5, and subjecting the resulting acid digestion mixture directly to a separating treatment to separate a stable oil therefrom, the process being carried out throughout at a temperature below that of substantial decomposition of the vitamin.

IVAN A. PARFENTJEV.